(12) United States Patent
Zhao et al.

(10) Patent No.: US 7,273,175 B2
(45) Date of Patent: Sep. 25, 2007

(54) METHOD, AN APPARATUS AND A STORAGE MEDIUM FOR LOCATING QR CODES

(75) Inventors: Hongsheng Zhao, Beijing (CN); Jiaqiang Liu, Beijing (CN); Lifeng Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 11/202,106

(22) Filed: Aug. 12, 2005

(65) Prior Publication Data

US 2006/0082475 A1    Apr. 20, 2006

(30) Foreign Application Priority Data

Sep. 7, 2004    (CN) .................... 2004 1 0076815

(51) Int. Cl.
    *G06K 7/10* (2006.01)
(52) U.S. Cl. .................... 235/454; 235/462.1; 235/494
(58) Field of Classification Search ........... 235/462.09, 235/462.01, 462.08, 462.1, 465.25, 462.46
    See application file for complete search history.

(56) References Cited

U.S. PATENT DOCUMENTS 6,279,830 B1 *  8/2001  Ishibashi .................... 235/494
2004/0020989 A1 *  2/2004  Muramatsu .............. 235/462.1

* cited by examiner

*Primary Examiner*—Michael G. Lee
*Assistant Examiner*—Kristy A. Haupt
(74) *Attorney, Agent, or Firm*—Fitzpatrick, Cella, Harper & Scinto.

(57) ABSTRACT

The present application relates to a method, an apparatus and a storage medium for locating QR codes. For automatically locating a plurality of QR codes in image of any size, the invention provides an apparatus for locating at least one QR code in an image, comprising: characteristic ratio detection means for detecting the potential QR code location symbol areas by carrying out a plurality of detections for detecting the characteristic ratio of the QR code; critical edge detection means for detecting the critical edges of the potential QR code location symbol areas so that the false areas are excluded; location symbol grouping means for matching the detected QR code location symbol areas into potential QR codes; and verification means for excluding the false QR codes. The invention also provides a corresponding method for locating at least one QR code.

12 Claims, 12 Drawing Sheets

Illustration:

☐ Irrelevant Point
H Horizontal Critical Edge Point
V Vertical Critical Edge Point

METHOD, AN APPARATUS AND A STORAGE MEDIUM FOR LOCATING QR CODES

FIELD OF THE INVENTION

The present invention relates to locating QR code, especially to a method and an apparatus for locating at least one QR code, and a storage medium storing therein program codes for implementing said method for locating at least one QR code.

BACKGROUND OF THE INVENTION

A QR code is a bi-dimensional "barcode". It is well know that a barcode expresses information with alternating black and white bars of different widths, and the black-white transition occurs along a direction crossing the longitudinal direction of the bars. When a barcode is to be detected and identified, it is scanned in said direction. That is, a barcode is uni-dimensional.

In contrast, a QR code expresses information with small bars distributed bi-dimensionally in a square area. If a barcode is considered to have one row of information, then a QR code has many rows of information.

Figure 1:
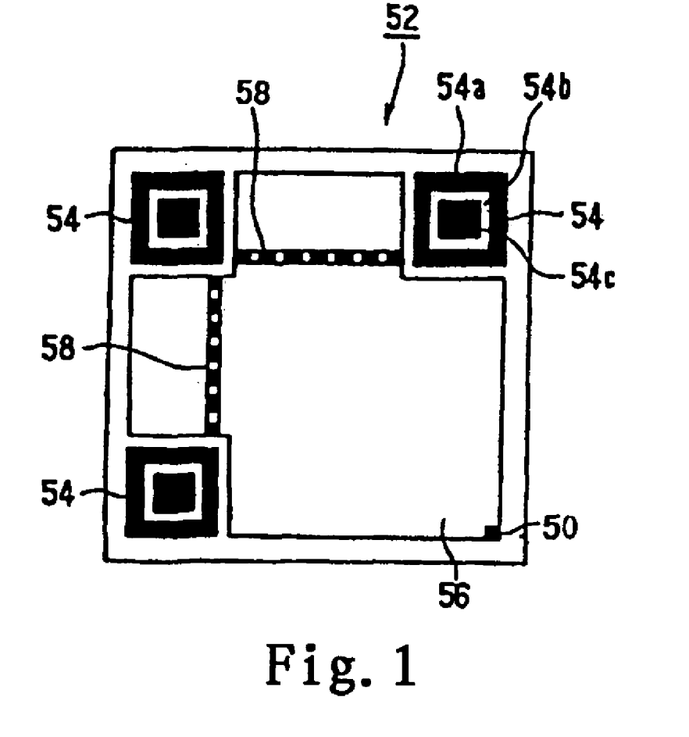
FIG. 1 is a schematic view of a QR code.

As shown in FIG. 1, a QR code 52 comprises three location symbols 54, two timing cell lines 58 and one ending point 50. The location symbols 54, the timing cell lines and the ending point are used in detecting the QR code and in initialization of the information identifying process, and the square area defined by them is the content area 56 containing the information to be expressed by the QR code.

Figure 21:
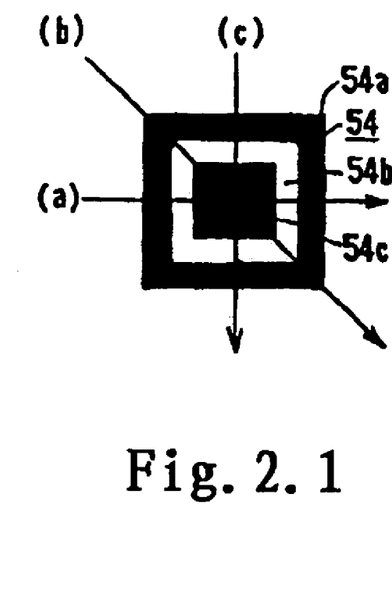
Figure 22:
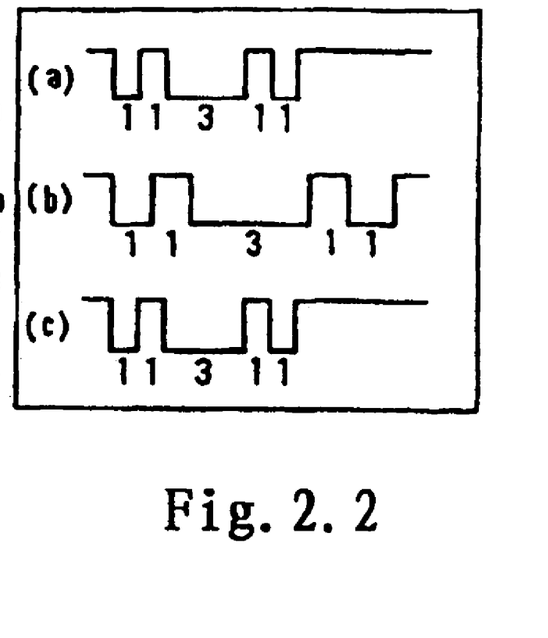

At the present, a timing cell line 58 is comprised of alternating black and white dots equally spaced, and a location symbol is comprised of a black square 54c surrounded by a white square frame 54b, which is further surrounded by a black square frame 54a. Any line crossing two opposite sides of the central black square 54c will be cut into 5 sections by the edges of the square and the frames, and the ratio of the 5 sections is 1:1:3:1:1, and hereinafter is referred to as the characteristic ratio. FIG. 2.1 shows three exemplary lines (a), (b) and (c) (including a diagonal (b)) crossing two opposite lines of the central square 54c, and FIG. 2.2 shows the waveform formed by scanning the location symbol along said lines, and the characteristic ratio is reflected therein.

When the information in a QR code is to be read out, the area containing the QR code is scanned and a binary image is obtained (or a binary image containing the QR code may already exist). Then the location symbols are detected, and thus the location of the QR code is determined with the location symbols together with the timing cell lines and the ending point. Consequently, the content area is identified and the content therein may be read out.

Conventionally, a QR code is used as a label or the like and functions to provide some brief information of the labeled object. The amount of such information is small. In such a case, generally there is only one QR code on an article and it is sufficient for the operator to scan the small area containing the QR code.

Correspondingly, the conventional method and apparatus for locating a QR code can only operate a small region image with the size of one or two inches during capturing or reading images, and the operator must manually or semi-automatically focus the scanner on the very portion of the QR code image to capture the right position of the QR code. Moreover, the conventional solution can only locate one QR code each time and it can only combine three location symbols.

Figure 3:
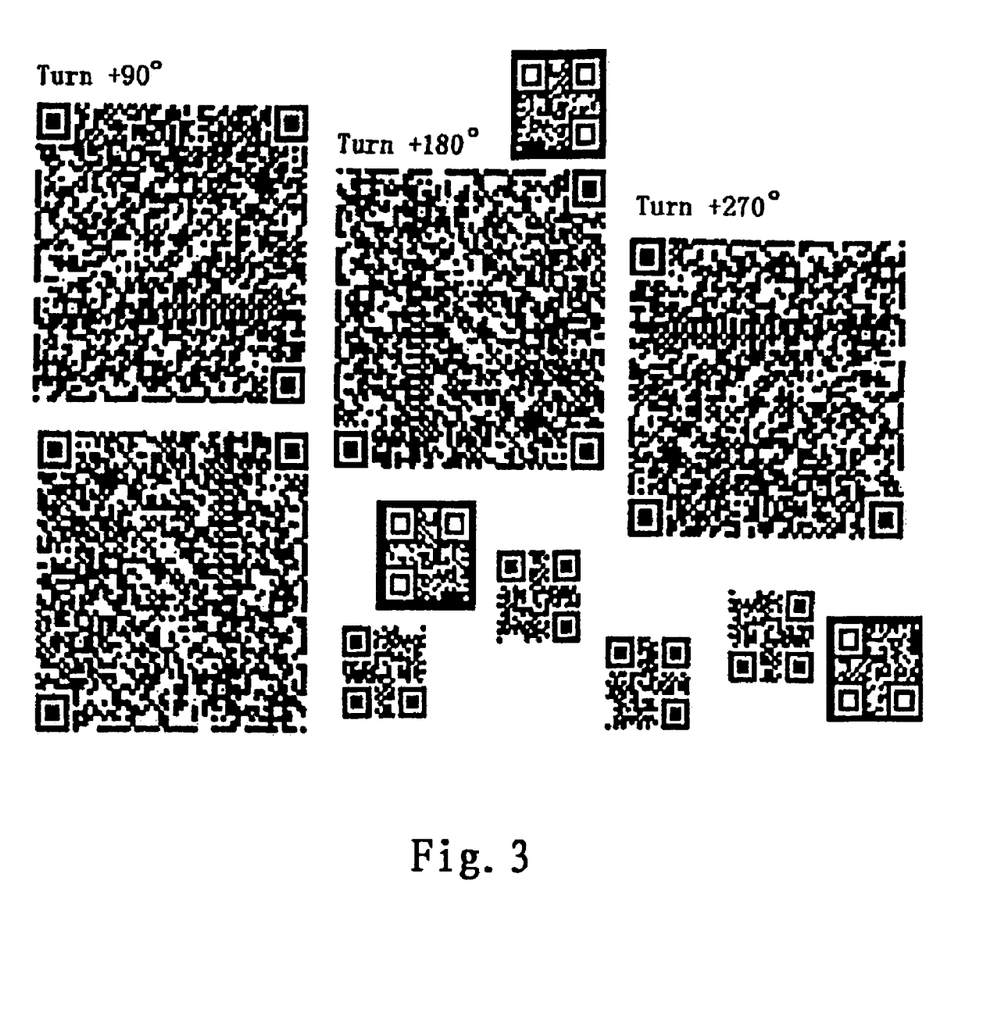
FIG. 3 is an example of an image containing a lot of QR codes in different size and orientation.

However, as the latest development, the QR code now is used to express more and more information and an image will contain a plurality of QR codes, for example as shown in FIG. 3. In such a case, the conventional locating solution will no longer work.

Furthermore, just as shown in FIG. 2.1 and FIG. 2.2, the conventional locating solution uses center and corner scan lines to locate the QR code, and such a method is very unreliable.

Another defect of the conventional solution is that it can only locate main black color QR code that is positively oriented, just as shown in FIG. 1. If the QR code is reversed or is placed in any other orientation, or if the image is inverted in color, then the conventional solution will not work.

SUMMARY OF THE INVENTION

Considering above problems, the present invention is proposed.

Specifically, one object of the present invention is to provide a method and an apparatus able to automatically locate a plurality of QR codes in image of any size.

For achieving above object, the invention provides an apparatus for locating at least one QR code in an image, comprising: characteristic ratio detection means for detecting the potential QR code location symbol areas by carrying out a plurality of detections for detecting the characteristic ratio of the QR code; critical edge detection means for detecting the critical edges of the potential QR code location symbol areas; location symbol grouping means for matching the detected QR code location symbol areas into potential QR codes; and verification means for excluding the false QR codes.

A method for locating at least one QR code in an image, comprising:

The invention also provides a characteristic ratio detection step for detecting the potential QR code location symbol areas by carrying out a plurality of detections for detecting the characteristic ratio of the QR code; a critical edge detection step for detecting the critical edges of the potential QR code location symbol areas; a location symbol grouping step for matching the detected QR code location symbol areas into potential QR codes; and a verification step for excluding the false QR codes.

The invention also provides a storage medium storing therein program codes for implementing said method for locating at least one QR code.

BRIEF DESCRIPTION OF THE DRAWINGS

Other objects, features and advantages of the invention will become more apparent after reading the following detailed description of the preferred embodiments. The accompanying drawings, which are incorporated in and constitute a part of the specification, illustrate embodiments of the invention and, together with the description, serve to explain the principles of the invention. In the drawings:

FIGS. 2.1 and 2.2 is respectively a schematic view of a location symbol of a QR code and the waveforms obtained by scanning the location symbol, for illustrating the characteristic ratio of the location symbol;

FIG. 7.1 is a diagram showing the horizontal characteristic ratio 1:1:3:1:1 detection processing on an image line;

FIG. 7.2 is a diagram showing the vertical characteristic ratio 1:1:3:1:1 detection processing on an image line;

FIG. 7.3 is an example of detecting three contiguous horizontal lines and three contiguous vertical lines;

FIG. 10.1 is an example showing how to calculate the critical edge, which is the inner boundary of the outer black frame of the location symbol;

FIG. 10.2 is an example showing how to detect the horizontal and vertical critical edge respectively, the horizontal critical edge points are marked with "H" and the vertical critical edge points are marked with "V";

DESCRIPTION OF THE PREFERRED EMBODIMENTS

Example of Computer System

The apparatus and the method of the invention may be implemented in any information processing equipment, for example, a personal computer (PC), a notebook, or a single-chip microcomputer (SCM) embedded in a camera, a video camera, a scanner, and etc. To a person skilled in the art, it would be easy to realize the apparatus and the method of the invention through software, hardware and/or firmware. It should be particularly noted that, to implement any step of the method or any combination of the steps, or any component of the apparatus or any combination of the components, it is obvious to a person skilled in the art that it may be necessary to use I/O device, memory device, microprocessor such as CPU, and the like. The following descriptions of the apparatus and the method of the invention will not necessarily mention such devices, although they are actually used.

Figure 4:
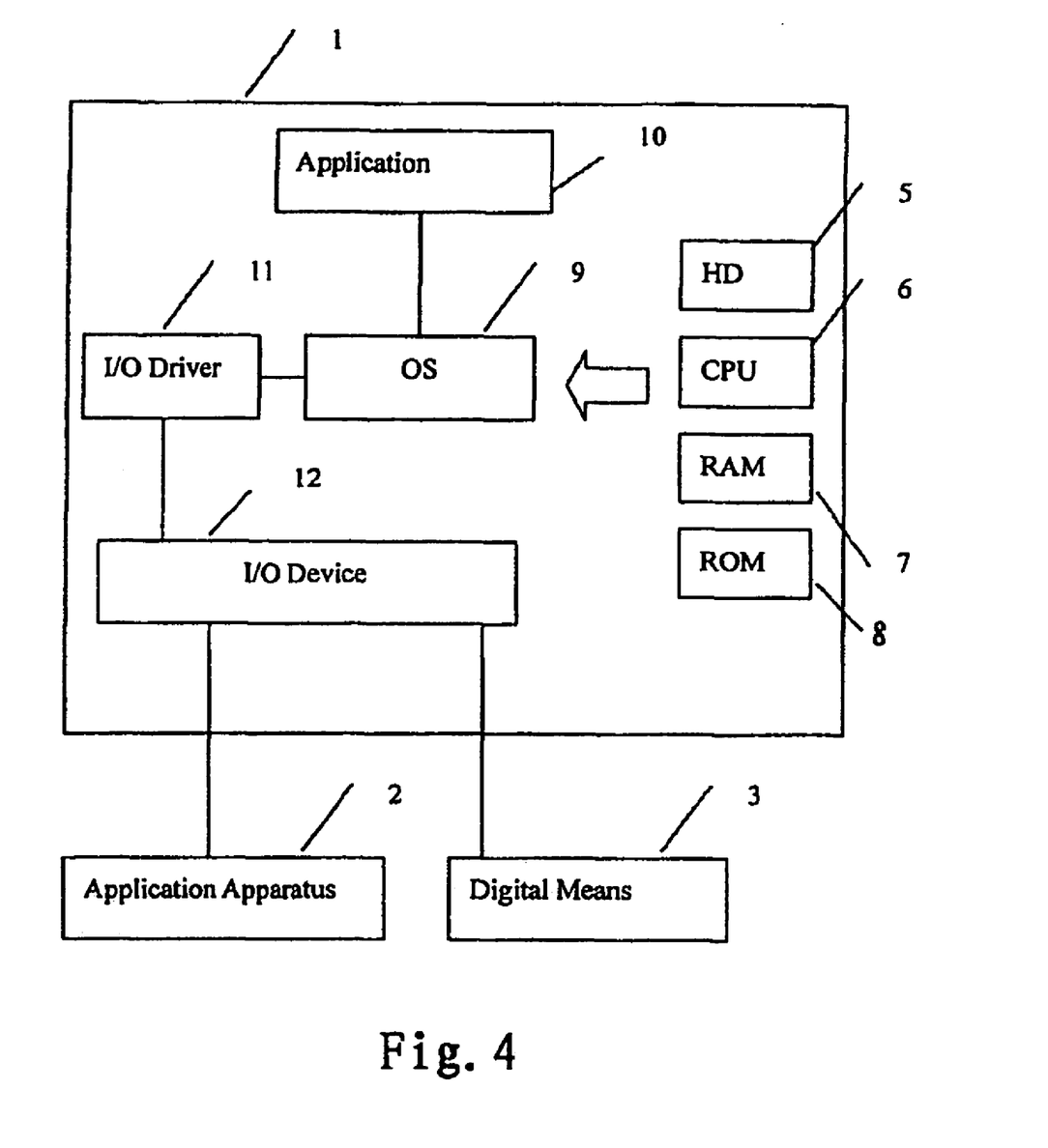
FIG. 4 is a block diagram showing an example of a computer system in which the method and apparatus of the invention may be implemented.

As the information processing equipment mentioned above, the block diagram illustrated in FIG. 4 shows an example of a computer system in which the method and apparatus of the invention may be implemented. Note that the computer system shown in FIG. 4 is just explanatory and does not intend to limit the scope of the invention.

From the viewpoint of hardware, a computer 1 comprises a CPU 6, a hard disk (HD) 5, a RAM 7, a ROM 8 and I/O devices 12. The I/O devices may include input means such as keyboard, touch pad, trackball and mouse and etc. output means such as printer and monitor, and input/output means such as floppy disk drive, optical disk drive and communication ports.

From the viewpoint of software, the computer comprises substantially operation system (OS) 9, I/O drivers 11 and various applications 10. As operating system, any commercially available OS may be used, such as Windows series (Windows is a trademark owned by Microsoft Corporation) or Linux-based OS. The I/O drivers are for driving respectively said I/O devices. The applications may be any kind of applications such as word processing application, image processing application and the like, and includes any existing applications that could be used in the present invention and applications programmed for the present invention, which call said existing applications.

Thus, in the present invention, the apparatus and the method may be implemented by the OS, the applications and I/O drivers in the hardware of the computer.

Further, the computer 1 may be connected to a digital means 3 and an application apparatus 2. The digital means serves as an image source and could be a camera, a video camera, a scanner or digitizer for converting analog image to digital image. The results obtained by the apparatus and the method of the invention are output to the application apparatus 2, which, on the basis of said results, executes proper operations. The application apparatus may also be embodied as another application (in combination with hardware) implemented within the computer 1 and for further processing the image.

Apparatus and Method for Locating QR Codes

Figure 5:
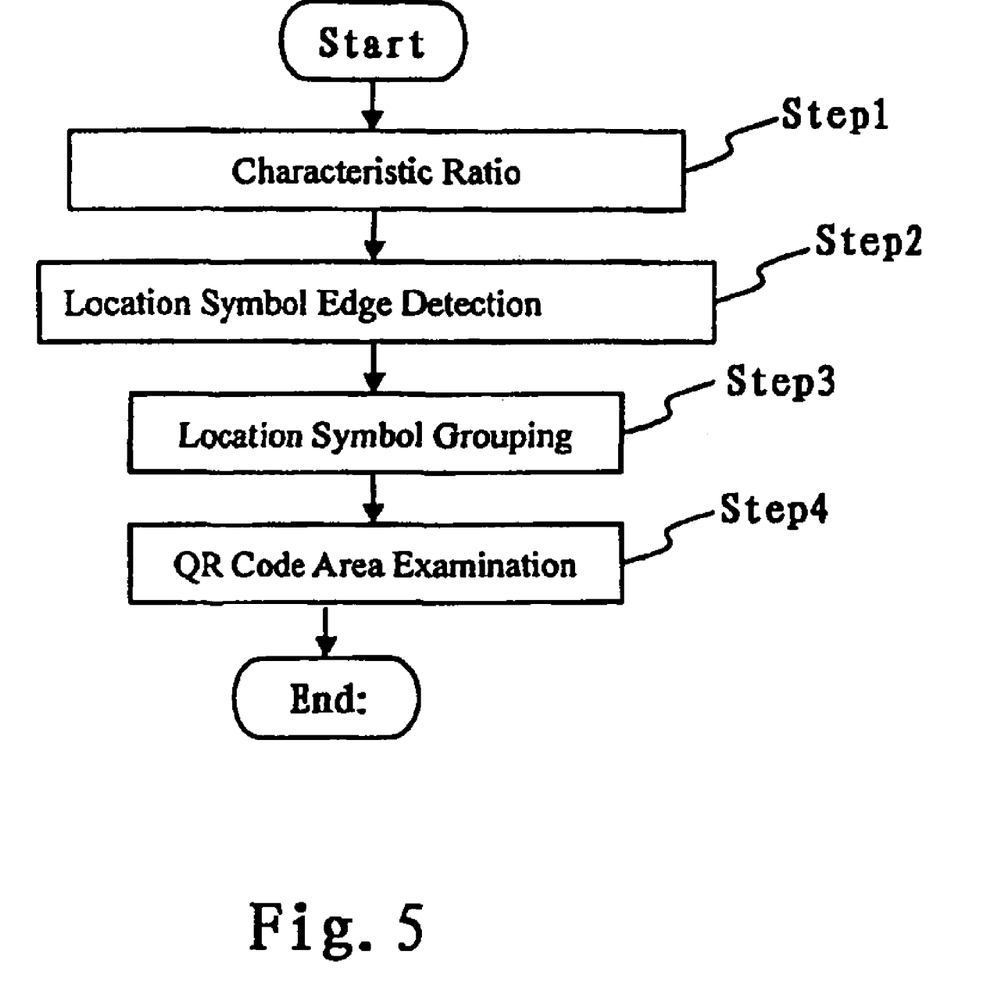
FIG. 5 is a main flowchart showing the QR code location method according to the present invention.

FIG. 5 is a main flow chart shows the main steps of the method of the invention to be executed by the apparatus of the invention. The apparatus for locating at least one QR code comprises: characteristic ratio detection means for executing Step 1: detecting the potential QR code location symbol areas by carrying out a plurality of detections for detecting the characteristic ratio of the location symbols; critical edge detection means for executing Step 2: detecting the critical edges of the potential QR code location symbol areas so that the false areas are excluded; location symbol grouping means for executing Step 3: matching the detected QR code location symbol areas into potential QR codes; and verification means for executing Step 4: excluding the false QR codes.

Figure 6:
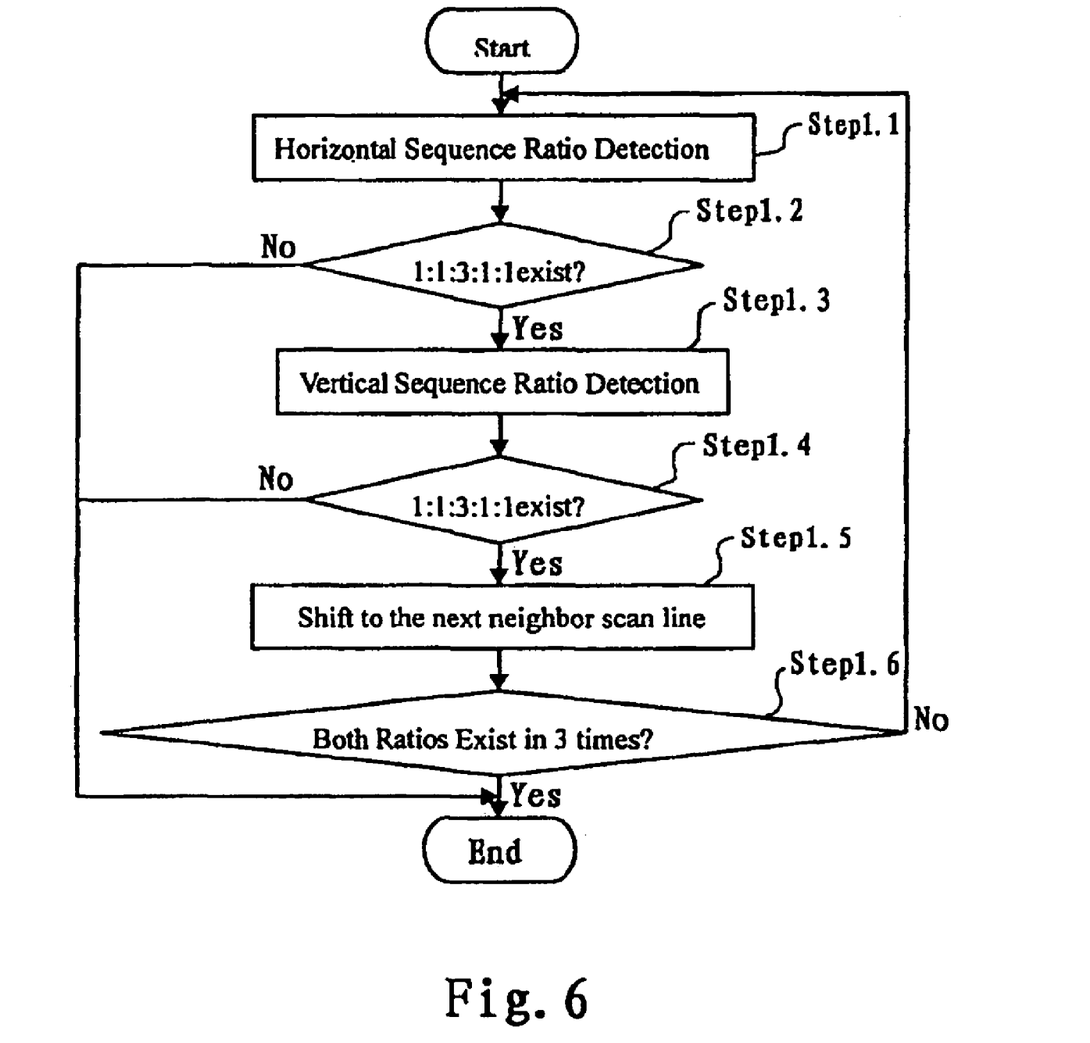
FIG. 6 is a flowchart showing the characteristic ratio detection process.

The characteristic ratio detection means may execute the Step 1 with conventional method and corresponding apparatus, such as that shown in FIG. 2.1 and FIG. 2.2. In the present invention, the inventors provide new means for executing the Step 1. Specifically, horizontal characteristic ratio detection means and vertical characteristic ratio detection means are provided. FIG. 6 shows a process executed by the horizontal characteristic ratio detection means and the vertical characteristic ratio detection means for detecting one potential local symbol. As shown in FIG. 6, in Step 1.1 carried out by the horizontal characteristic ratio detection means, detection is carried out to see whether there is a horizontal line containing the characteristic ratio (that is, at least a section of the line contains black subsections and white subsections, the ratio of the lengths of which is equal to 1:1:3:1:1) (Step 1.2). If yes, then a Step 1.3 is carried out by the vertical characteristic ratio detection means: detection is carried out in a vertical line crossing the central black subsection of said detected section. If the characteristic ratio existed in a corresponding vertical line section the detected vertical line (Step 1.4), then it may be determined that the square area defined by said horizontal line and said vertical line section is a potential location symbol.

In a preferred embodiment of the invention, if the horizontal characteristic ratio detection means and the vertical characteristic ratio detection means respectively detect said horizontal line section and said vertical line section, the detection is shift to the next neighbor scan line (horizontal and vertical respectively) (Step 1.5). The above process is repeated twice, and only when the characteristic ratio is detected in both three horizontal lines and three vertical lines (Step 1.6), will the corresponding square area be considered as a potential location symbol, and a new process as shown in FIG. 6 will begin for find out the next potential location symbol; otherwise the process is repeated from beginning for the next horizontal line.

Figure 71:
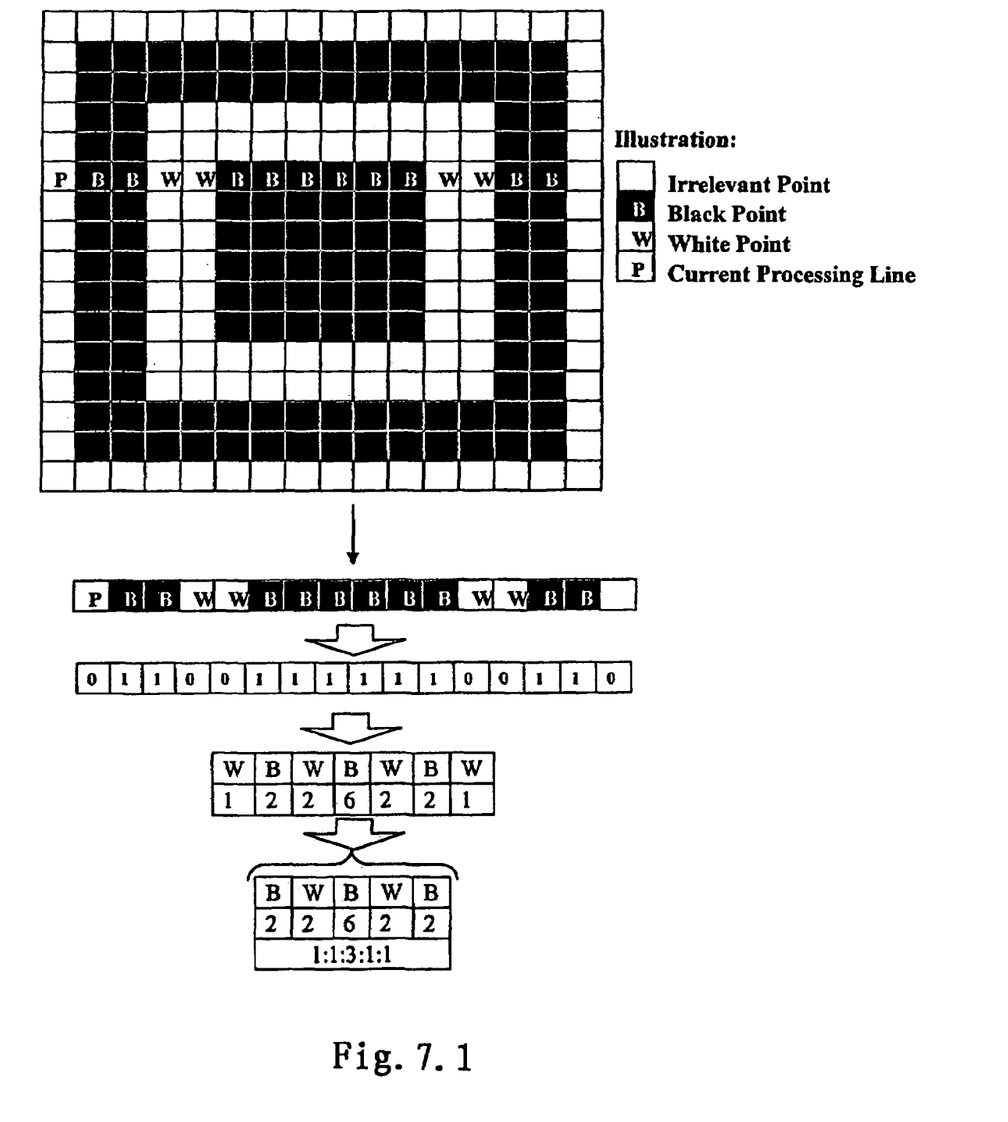

FIG. 7.1 shows an example about how the horizontal characteristic ratio detection means carries out the Step 1.1. In the horizontal line of the image to be detected, every pixel has the value of either "1" (black pixel) or "0" (white pixel). Counting the connected pixels and a sequence is obtained, from the sequence a ratio may be determined. Then it may be compared to the characteristic ratio to see whether they match each other.

Figure 72:
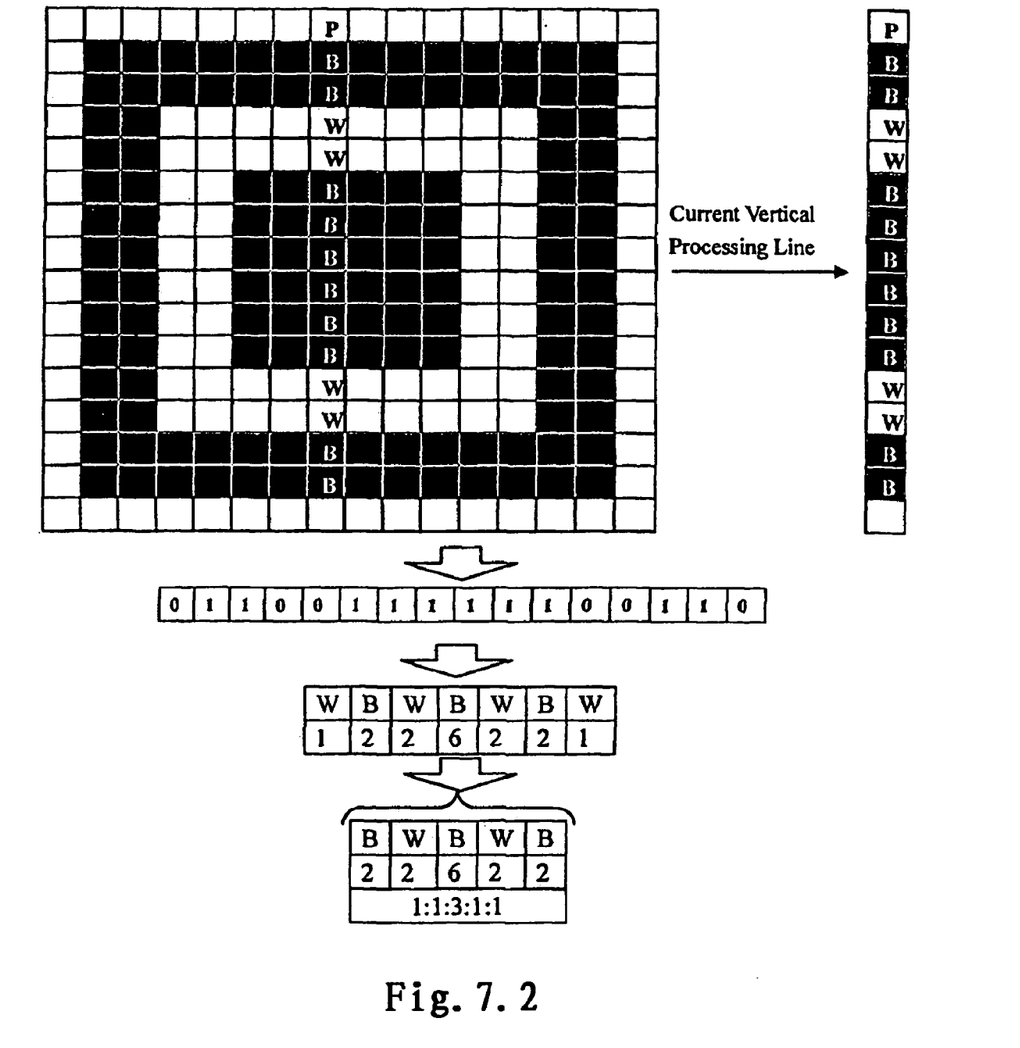

FIG. 7.2 shows an example about how the vertical characteristic ratio detection means carries out the Step 1.2. Except that the line is vertical instead of horizontal, the other aspects are the same as those shown in FIG. 7.1.

Figure 73:
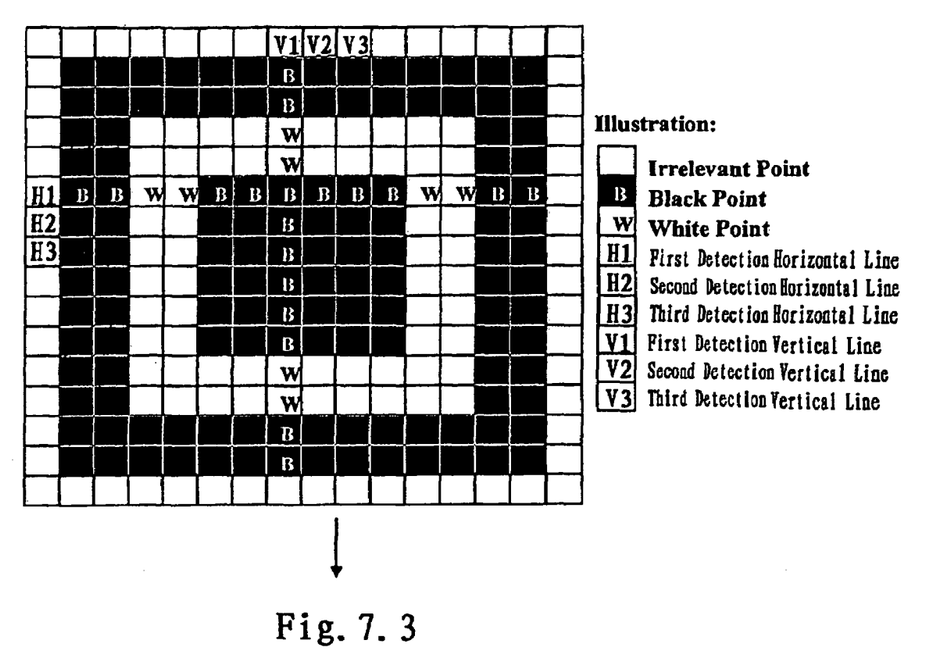
Figure 101:
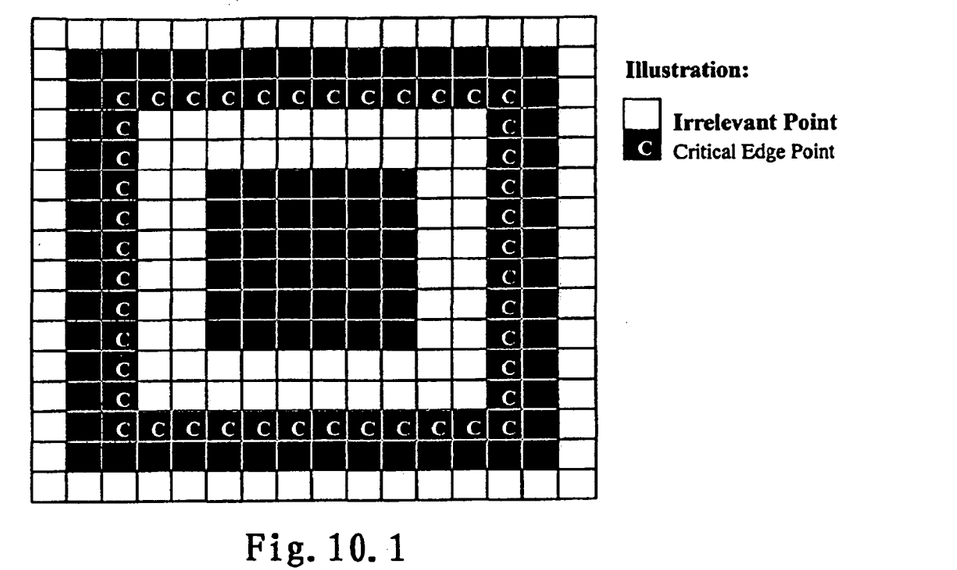

FIG. 7.3 is a schematic view showing the process in FIG. 6 in another way. When detecting the location symbols, pixel lines are scanned one by one from top to bottom. After a first horizontal line H1 containing the characteristic ratio is detected, a first vertical line V1 crossing the central black subsection of the first horizontal line H1 is detected to see whether it also contains the characteristic ratio and may constitute together with the first horizontal line H1 a location symbol. Then a second horizontal line H2, a second vertical line V2, a third horizontal line H3 and a third vertical line V3 are further detected to see whether they also contain the characteristic ratio that corresponds to the first horizontal line and the first vertical line. If the result of every step above is yes, then a potential location symbol as shown in FIG. 7.3 may be determined. About the detection direction, it is not necessarily from top to bottom. It also may be from bottom to top, from left to right or from right to left.

For improving the speed of the method and apparatus and reducing the memory consumption, the invention further provides a novel method and novel means for detecting the characteristic ratio. Specifically, the invention provides transformation means for pre-processing the line to be detected before above Steps 1.1 and 1.3 (or before Step 1).

Specifically, in a binary image, a pixel corresponds to a bit in the memory. The value "1" represents black pixel and the value "0" represents white pixel. As discussed with reference to FIGS. 6, 7.1 and 7.2, when detecting the characteristic ratio, the invention needs to count the connected pixels. Conventionally, that needs to count the bits that are adjacent and of the same value. That is, it needs to operate the bit, although, as we known, the information in any present information apparatus is expressed in bytes. This problem will dramatically decrease the processing speed and increase the memory consumption.

Figure 8:
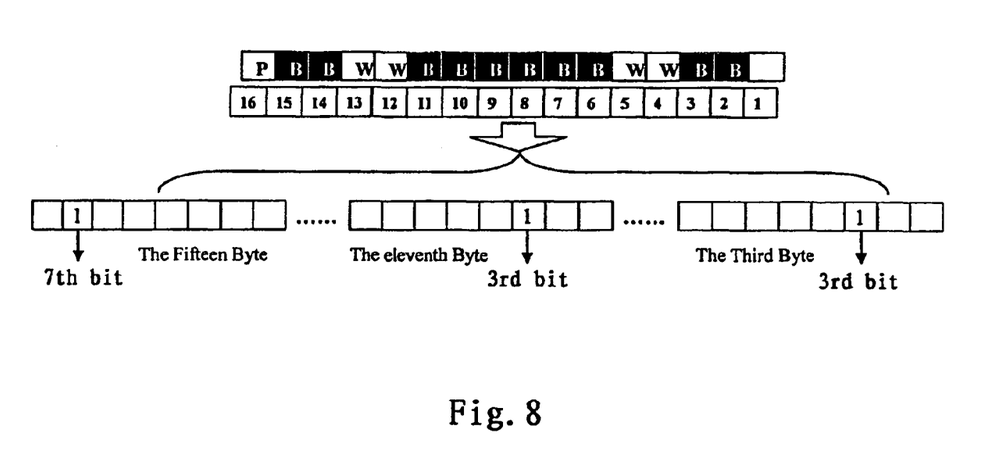
FIG. 8 is a diagram showing the bit-byte transformation mapping operation on an image line.

For solving the problem, the inventors propose to extend each bit into a byte with transformation means. As shown in FIG. 8, if a line contains N pixels (N=8m, m is a natural number, here as an example, N=16), that is N bits (m bytes), then the line will be extended into N bytes. For a nth pixel (n=1, 2, ... N) that is black (that is, for a nth bit that is "1"), the (n mod 8)th bit of the nth byte is set as "1". The other bits of the N bytes are all set as "0". Then the counting operation in Steps 1.1 and 1.3 may be carried out on the N bytes, because there are only two kinds of bytes: zero byte and non-zero byte. The advantage of the adopting the transformation means is that the characteristic ratio detecting operation is simplified because the operation is carried directly on the bytes, instead of the bits. When restoring the pixel line, it only needs to perform "OR" operation on each 8 transformation bytes to restore one corresponding byte of the pixel line.

Figure 9:
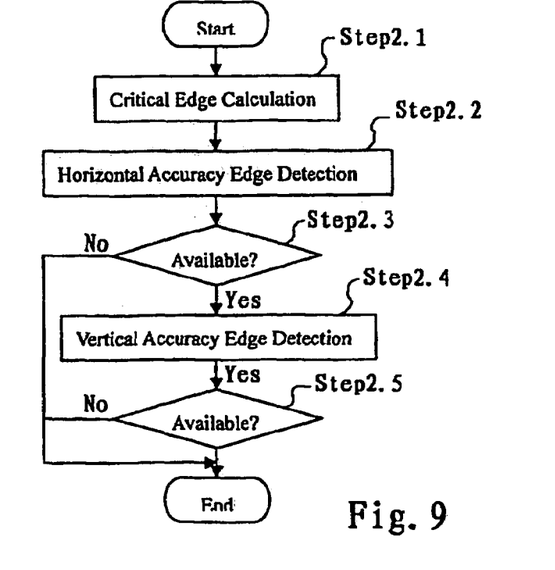
FIG. 9 is a flowchart showing the location symbol edge detection process.

FIG. 9 and FIGS. 10.1 and 10.2 show a specific example of Step 2 executed by the critical edge detection means. The critical edge detection means include a critical edge calculator, a horizontal edge detector and a vertical edge detector. In Step 2.1, based on the results of Step 1, such as shown in FIG. 7.3, critical edge points C are found out with the critical edge calculator, as shown in FIG. 10.1. That is, from, for example, the results shown in FIG. 7.3, a square frame formed of black pixels C is expected.

Figure 102:
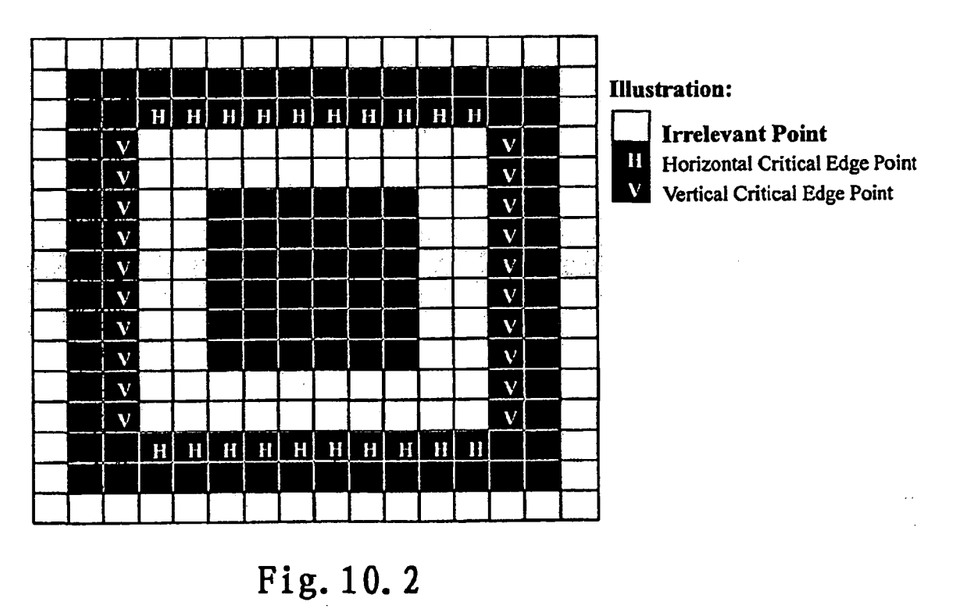

Then in Step 2.2, the horizontal edge detector confirms whether the expected horizontal edges H do contain no white pixels; and in Step 2.4, the vertical edge detector confirms whether the expected vertical edges H do contain no white pixels. Only when both horizontal edges and both vertical edges are confirmed (Steps 2.3 and 2.5), the corresponding location symbol is confirmed as a potential location symbol.

Figure 11:
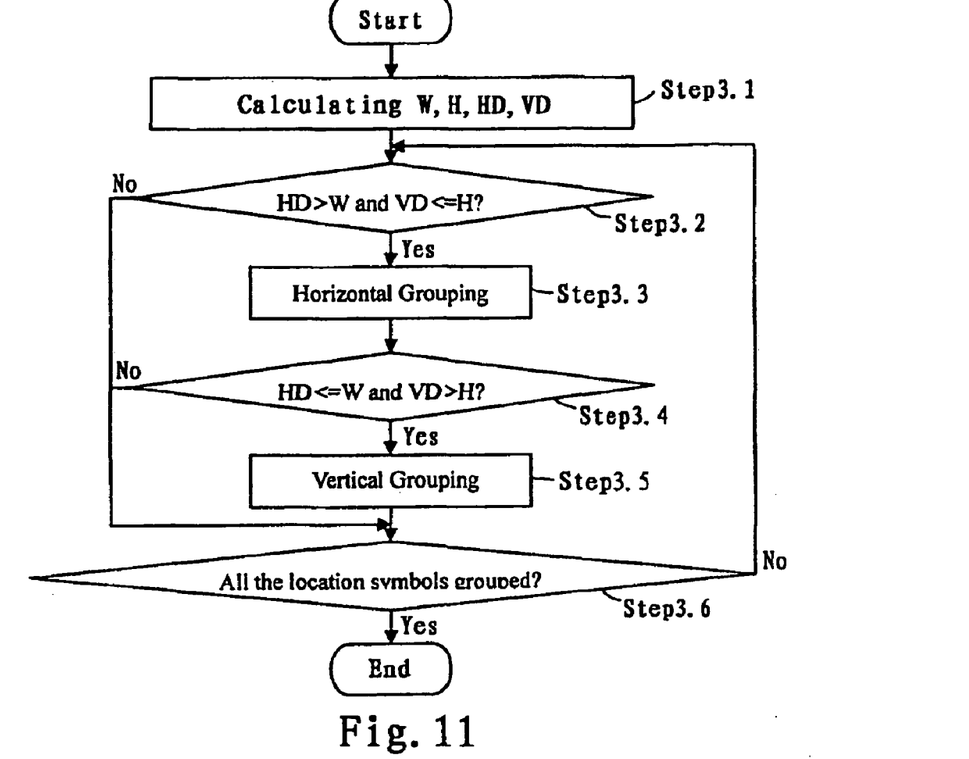
FIG. 11 is a flowchart showing the QR code location symbol grouping process.
Figure 12:
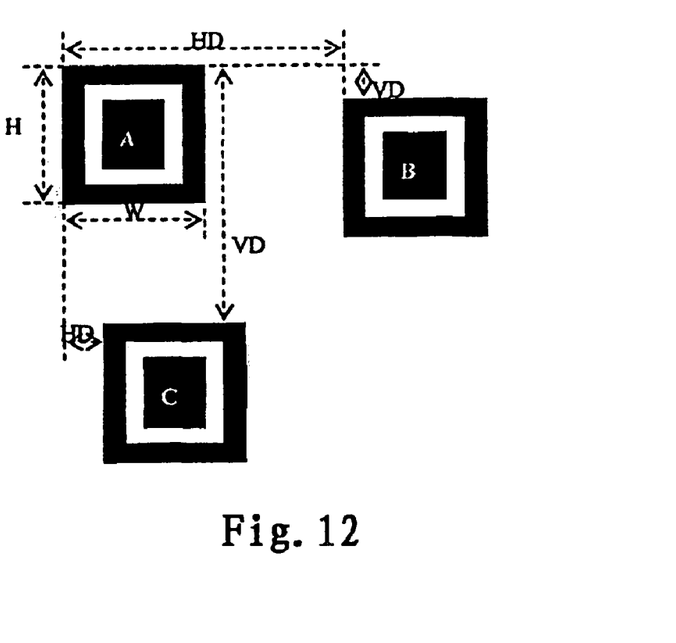
FIG. 12 is a schematic view illustrating the grouping rule.

The next step of the invention is to group the location symbols into potential QR code (Step 3). For this purpose, the location symbol grouping means comprises a comparator and a sorting means. In Step 3.1 (FIG. 11), the comparator calculates the width W and height H of each location symbol and the horizontal distance HD and vertical distance VD between adjacent location symbols, as shown in FIG. 12.

Then in Step 3.2, the comparator compares W and H of a first location symbol A with HD and VD between the first location symbol of its adjacent location symbols such as B and C. If HD>W and VD<=H, then the two corresponding location symbols (A and B) shall be grouped horizontally (Step 3.3). If HD<=W and VD>H (Step 3.4), then the two corresponding location symbols (A and C) shall be grouped vertically (Step 3.5). If a location symbol has two other location symbols grouped therewith respectively horizontally and vertically, the three location symbols will constitute a potential QR code. The process is repeated (Step 3.6) until all the location symbols are grouped.

In a preferred embodiment, the grouping means may further comprise overlap detection means for detecting the overlap between QR codes, and thus false matching may be excluded.

Figure 13:
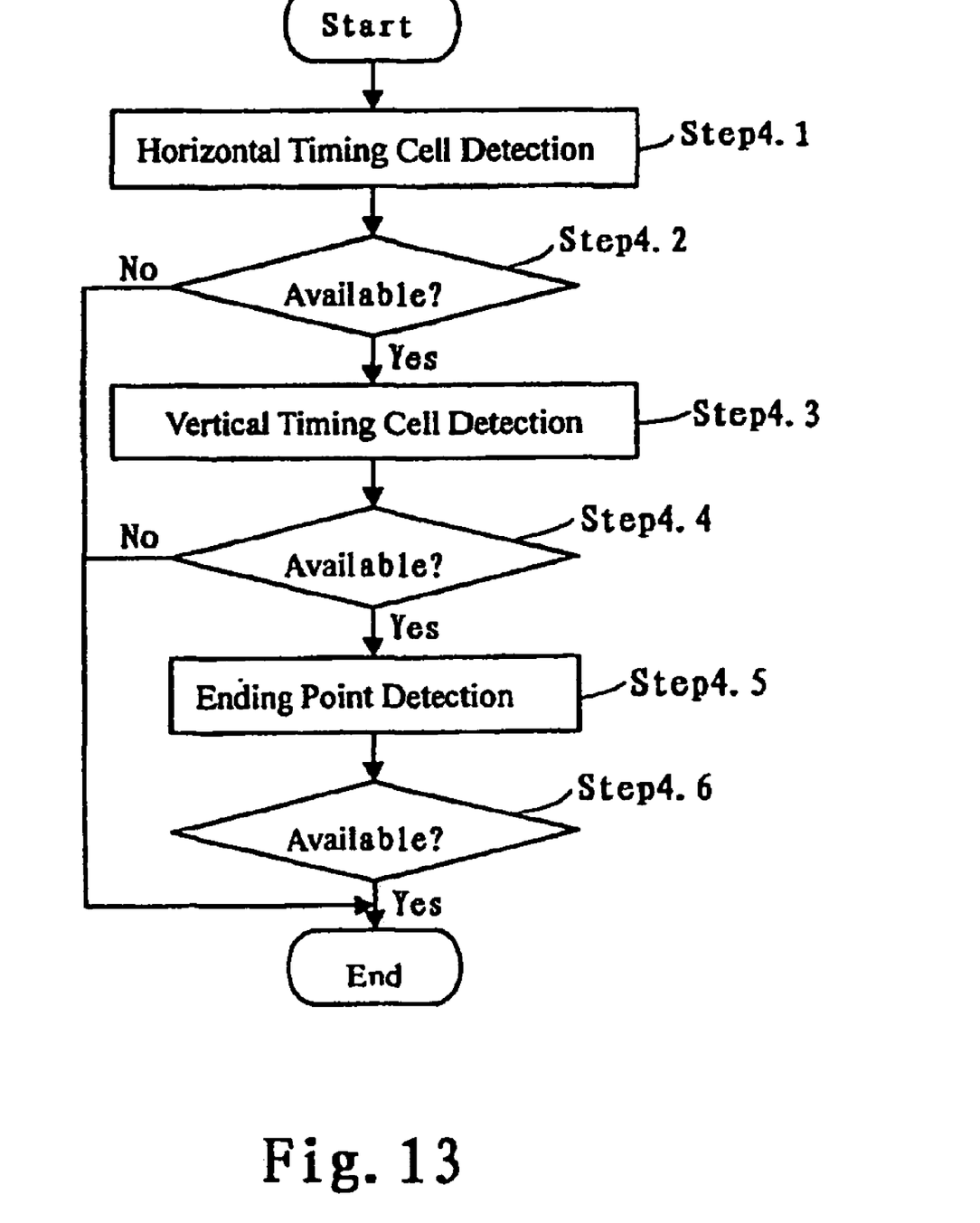
FIG. 13 is a flowchart showing the QR code area examination processing.

Thus potential QR codes are obtained. In the next Step 4, a verification will be executed by the verification means for excluding the false QR codes. The verification means comprises timing cell detection means and ending point detection means. In Step 4.1, the timing cell detection means detects whether there is a timing cell line 58 between two horizontally grouped location symbols by detecting the timing cell characteristic ratio(1:1:1 . . . ). In Step 4.3, the timing cell detection means detects whether there is a timing cell line 58 (see FIG. 1) between two vertically grouped location symbols by detecting the timing cell characteristic ratio (1:1:1 . . . ). The detecting method is similar to that used in detecting characteristic ratio of the location symbol as described above, and is omitted here. Finally, in Step 4.5, the ending point detection means detects whether an ending point exists or not in the corner, of the potential QR code, without QR code location symbol. Only when all the above three steps give out a positive result (Steps 4.2, 4.4 and 4.6), will the potential QR code be confirmed.

Storage Medium

The objects of the invention may also be realized through running a program or a set of programs on any information processing equipment as described above, which may be communicated with any image source and any subsequent processing apparatus. Said information processing equipment, image source and subsequent processing apparatus may be all well-known universal equipments. Therefore, the objects of the invention may be realized by merely providing program codes, which can implement said method or apparatus. That is to say, a storage medium storing program codes for implementing said method constitutes the invention.

For a person skilled in the art, it would have been easy to program said method using any program language. Therefore, a detailed description of the program codes is omitted.

And obviously, said storage medium may be of any type known by a person skilled in the art or developed in the future, so it is unnecessary to enumerate various storage media herein.

From above, it could be seen that the present invention has the following advantages:

1. The present invention can operate huge and infinity region image with fast speed and low memory consumption and can be used in image device of any kind;

2. The present invention can automatically locate QR code position and never concerns whether the image should be adjusted or not beforehand;

3. The present invention can locate all the QR codes in an image by scanning the image only once;

4. The present invention provides a stable and accurate solution for locating the QR code.

5. The present invention can find the distinct orientation with main black or white color QR code at the same time.

The present invention may be applied to a scanner, a monitor, a camera or any other image processing system including a computer, and may successfully get the accurate position of each QR code in a binary document image containing more than one QR code.

While the invention has been described with reference to specific steps and structures disclosed herein, it is not confined to the details set forth and this application is intended to cover all the changes, modifications and variations which are not far away from the spirit and the scope of the invention.

The invention claimed is:

1. An apparatus for locating at least one QR code in an image, comprising:
   characteristic ratio detection means for detecting the potential QR code location symbol areas by carrying out a plurality of detections for detecting the characteristic ratio of the location symbols;
   critical edge detection means for detecting the critical edges of the potential QR code location symbol areas;
   location symbol grouping means for matching the detected QR code location symbol areas into potential QR codes; and
   verification means for excluding the false QR codes,
   wherein the characteristic ratio detection means further comprises:
   horizontal characteristic ratio detection means for detecting the characteristic ratio in horizontal lines of the image; and
   vertical characteristic ratio detection means for detecting the characteristic ratio in vertical lines selected according to the detection results of said horizontal characteristic ratio detection means,
   and wherein said horizontal characteristic ratio detection means is further configured to detect the characteristic ratio in two contiguous horizontal lines after having detected the first horizontal line containing the characteristic ratio, and
   said vertical characteristic ratio detection means is further configured to detect the characteristic ratio in three contiguous vertical lines selected according to the detection results of said horizontal characteristic ratio detection means.

2. The apparatus as claimed in claim 1, characterized in that said characteristic ratio detection means further comprises transformation means for converting a to-be-detected line containing N pixels (N=8m, m is a natural number) into N bytes, wherein for a nth pixel (n=1, 2, . . . N) that is black, the (n mod 8)th bit of the nth byte is set as "1", and
   said horizontal characteristic ratio detection means and said vertical characteristic ratio detection means carry out the detecting operations on said N bytes.

3. An apparatus for locating at least one QR code in an image, comprising:
   characteristic ratio detection means for detecting the potential QR code location symbol areas by carrying out a plurality of detections for detecting the characteristic ratio of the location symbols;
   critical edge detection means for detecting the critical edges of the potential QR code location symbol areas;
   location symbol grouping means for matching the detected QR code location symbol areas into potential QR codes; and
   verification means for excluding the false QR codes,
   wherein the critical edge detection means comprises:
   a critical edge calculator for calculating the expected critical edges of the potential location symbol based on the results output from the characteristic ratio detection means;
   a horizontal edge detector for confirming whether the expected horizontal critical edges contain no white pixels; and
   a vertical edge detector for confirming whether the expected vertical edges contain no white pixels.

4. All apparatus for locating at least one QR code in an image, comprising:
   characteristic ratio detection means for detecting the potential QR code location symbol areas by carrying out a plurality of detections for detecting the characteristic ratio of the location symbols;
   critical edge detection means for detecting the critical edges of the potential QR code location symbol areas;
   location symbol grouping means for matching the detected QR code location symbol areas into potential QR codes; and
   verification means for excluding the false QR codes,
   wherein the location symbol grouping means further comprises:
   a comparator for calculating the width W and height H of each location symbol and the horizontal distance HD and vertical distance VD between adjacent location symbols, and comparing them with each other; and
   sorting means, for horizontally grouping a location symbol with its adjacent location symbol if HD>W and VD<=H, and vertically grouping a location symbol with its adjacent location symbol if HD<=W and VD>H.

5. The apparatus as claimed in claim 4, characterized in that the grouping means may further comprise overlap detection means for detecting the overlap between QR codes, and thus false grouping may be excluded.

6. A method for locating at least one QR code in an image, comprising:
a characteristic ratio detection step for detecting the potential QR code location symbol areas by carrying out a plurality of detections for detecting the characteristic ratio of the QR code;
a critical edge detection step for detecting the critical edges of the potential QR code location symbol areas;
a location symbol grouping step for matching the detected QR code location symbol areas into potential QR codes; and
a verification step for excluding the false QR codes,
wherein the characteristic ratio detection step further comprises:
a horizontal characteristic ratio detection step for detecting the characteristic ratio in horizontal lines of the image; and
a vertical characteristic ratio detection step for detecting the characteristic ratio in vertical lines selected according to the detection results of said horizontal characteristic ratio detection step,
and wherein said horizontal characteristic ratio detection step comprises detecting the characteristic ratio in two contiguous horizontal lines after having detected the first horizontal line containing the characteristic ratio, and
said vertical characteristic ratio detection step comprises detecting the characteristic ratio in three contiguous vertical lines selected according to the detection results of said horizontal characteristic ratio detection step.

7. The method as claimed in claim 6, characterized in that said characteristic ratio detection step further comprises a transformation step, before said horizontal characteristic ratio detection step and vertical characteristic ratio detection step, for converting a to-be-detected line containing N pixels (N=8m, m is a natural number) into N bytes, wherein for a nth pixel (n=1, 2, ... N) that is black, the (n mod 8)th bit of the nth byte is set as "1", and
said horizontal characteristic ratio detection step and said vertical characteristic ratio detection step carry out the detecting operations on said N bytes.

8. A method for locating at least one QR code in an image, comprising:
a characteristic ratio detection step for detecting the potential QR code location symbol areas by carrying out a plurality of detections for detecting the characteristic ratio of the QR code;
a critical edge detection step for detecting the critical edges of the potential QR code location symbol areas;
a location symbol grouping step for matching the detected QR code location symbol areas into potential QR codes; and
a verification step for excluding the false QR codes,
wherein the critical edge detection step comprises:
a critical edge calculating step for calculating the expected critical edges of the potential location symbol based on the results of the characteristic ratio detection step;
a horizontal edge detecting step for confirming whether the expected horizontal critical edges contain no white pixels; and
a vertical edge detecting step for confirming whether the expected vertical edges contain no white pixels.

9. A method for locating at least one QR code in an image, comprising:
a characteristic ratio detection step for detecting the potential QR code location symbol areas by carrying out a plurality of detections for detecting the characteristic ratio of the QR code;
a critical edge detection step for detecting the critical edges of the potential QR code location symbol areas;
a location symbol grouping step for matching the detected QR code location symbol areas into potential QR codes; and
a verification step for excluding the false QR codes,
wherein the location symbol grouping step further comprises:
a comparing step for calculating the width W and height H of each location symbol and the horizontal distance HD and vertical distance VD between adjacent location symbols, and comparing them with each other; and
a sorting step for: horizontally grouping a location symbol with its adjacent location symbol if HD>W and VD<=H, and vertically grouping a location symbol with its adjacent location symbol if HD<=W and VD>H.

10. An apparatus for locating at least one QR code in an image, comprising:
characteristic ratio detection means for detecting the potential QR code location symbol areas by carrying out a plurality of detections for detecting the characteristic ratio of the location symbols;
critical edge detection means for detecting the critical edges of the potential QR code location symbol areas;
location symbol grouping means for matching the detected QR code location symbol areas into potential QR codes; and
verification means for excluding the false QR codes,
wherein the characteristic ratio detection means further comprises:
horizontal characteristic ratio detection means for detecting the characteristic ratio in horizontal lines of the image; and
vertical characteristic ratio detection means for detecting the characteristic ratio in vertical lines selected according to the detection results of said horizontal characteristic ratio detection means,
and wherein said characteristic ratio detection means further comprises transformation means for converting a to-be-detected line containing N pixels (N=8m, m is a natural number) into N bytes, wherein for a nth pixel (n=1, 2, ... N) that is black, the (n mod 8)th bit of the nth byte is set as "1", and
said horizontal characteristic ratio detection means and said vertical characteristic ratio detection means carry out the detecting operations on said N bytes.

11. A method for locating at least one QR code in an image, comprising:
a characteristic ratio detection step for detecting the potential QR code location symbol areas by carrying out a plurality of detections for detecting the characteristic ratio of the QR code;
a critical edge detection step for detecting the critical edges of the potential QR code location symbol areas;
a location symbol grouping step for matching the detected QR code location symbol areas into potential QR codes; and
a verification step for excluding the false QR codes,
wherein the characteristic ratio detection step further comprises:

a horizontal characteristic ratio detection step for detecting the characteristic ratio in horizontal lines of the image; and a vertical characteristic ratio detection step for detecting the characteristic ratio in vertical lines selected according to the detection results of said horizontal characteristic ratio detection step, and wherein said characteristic ratio detection step further comprises a transformation step, before said horizontal characteristic ratio detection step and vertical characteristic ratio detection step, for converting a to-be-detected line containing N pixels (N=8m, m is a natural number) into N bytes, wherein for a nth pixel (n=1, 2, . . . N) that is black, the (n mod 8)th bit of the nth byte is set as "1", and said horizontal characteristic ratio detection step and said vertical characteristic ratio detection step carry out the detecting operations on said N bytes.

12. A computer-readable storage medium, characterized in that computer-executable program code for implementing the method claimed in claim 6, 7, 8, 9, or 11 is stored therein.

* * * * *

UNITED STATES PATENT AND TRADEMARK OFFICE
CERTIFICATE OF CORRECTION

PATENT NO. : 7,273,175 B2  
APPLICATION NO. : 11/202106  
DATED : September 25, 2007  
INVENTOR(S) : Hongsheng Zhao et al.

Page 1 of 1

It is certified that error appears in the above-identified patent and that said Letters Patent is hereby corrected as shown below:

COLUMN 4:
  Line 60, "section" should read --section of--.

COLUMN 5:
  Line 14, "pixels and a sequence is obtained," should read -- pixels, a sequence is obtained, and --.

COLUMN 6:
  Line 17, "do" should be deleted; and
  Line 19, "do" should be deleted.

COLUMN 8:
  Line 42, "All apparatus" should read -- An apparatus --.

Signed and Sealed this

Third Day of March, 2009

JOHN DOLL  
*Acting Director of the United States Patent and Trademark Office*